Inventors.
Wesley L. Taylor,
Charles H. Priesmeyer,
Ernst C Sauerman &
David H. Thorburn,
By Hume, Clement, Hume, & Lee.
Attys.

3,472,014
PROGRAMMING APPARATUS
Wesley L. Taylor, Glenview, Charles H. Priesmeyer, Park Ridge, Ernst C. Sauerman, Chicago, and David H. Thorburn, Oak Park, Ill., assignors, by mesne assignments, to Powers Regulator Company, Skokie, Ill., a corporation of Delaware
Filed Oct. 25, 1967, Ser. No. 677,918
Int. Cl. D01h *13/00;* F15b *5/00;* G05d *16/00*
U.S. Cl. 57—93                                                    21 Claims

ABSTRACT OF THE DISCLOSURE

Programming apparatus including a program cam, pneumatic force balance exhaust valve having a pressure chamber connected to a source of supply pressure through a restriction, cam follower for sensing and translating the contour of said program cam into a modulating force applied to the force balance valve such that the pressure in the pressure chamber is a function of the contour of the program cam and relative motion between the program cam and the cam follower, and means for effecting relative motion between the program cam and the cam follower. The programming apparatus is disclosed in combination with a spinning frame in which speed of the bobbin carrying spindles is programmed by the contour of an interchangeable profile card program cam and the gradual advance of the spinning frame ring rail. The cam follower and the force balance valve are both preferably mounted on a vertical rod which is advanced with the gradual advance of the ring rail. Alternate pneumatic and friction pad clutches for the rod are disclosed. An embodiment is disclosed in which the force balance valve programs the set point of a receiver controller which has a process variable input receiving an actual spindle speed pressure signal from a pneumatic tachometer for control of the spindle variable speed drive.

---

This invention relates to programmers and, in particular, to pneumatic apparatus for programming an operational parameter in a system.

It is frequently necessary or desirable in systems or processes to provide a predetermined program for a given operational parameter. For example, it has been determined that considerable savings can be effected in the spinning of yarns on a spinning machine if the speed of rotation of the bobbin carrying spindles can be properly programmed with respect to the position of the ring rail of the spinning machine as the ring rail progresses through its reciprocating gradually advancing movement along the length of the bobbin. The general production objective is to spin at the maximum possible speed with a minimum rate of yarn breakage. For any given yarn type and given spinning frame, there appears to exist an economic optimum program of spindle speed versus ring rail position. Since the program will differ from one spinning frame to another and from one yarn type to another and since the precise program will normally be the product to empirical determination, a need exists for a spindle speed programmer which is highly versatile in terms of program variations yet capable of accurate, high fidelity program repetition from spinning run to spinning run. Moreover, the programmer should attain these characteristics with minimum complexity and minimum cost of manufacture.

Therefore, it is a primary object of the present invention to provide apparatus for programming an operational parameter in a system in which programming apparatus is characterized by versatility yet accurate, high fidelity program repetition. This is achieved by the provision in the present invention of the novel combination of a program cam, a pneumatic force balance exhaust valve means which includes a control pressure chamber connected to a source of supply pressure through a restriction, and cam follower means for sensing and translating the profile of the program cam to a modulating force applied to the force balance valve means such that the pressure in the pressure chamber is a function of the profile of the program cam.

It is another primary object of the present invention to provide apparatus for programming the spindle speed in a winding machine in response to the gradual or stepped advance of the ring rail in accordance with a predetermined program. Accordingly, in a preferred embodiment of the invention, the program cam previously referred to is stationarily mounted, and both the cam follower means and the valve means are carried on a rod which is mounted adjacent the program cam and is gradually advanced with the gradual advance of the ring rail thereby eliminating the need for complex linkage systems. A pneumatic motor is connected to the pressure chamber for varying a variable speed drive to modulate the spindle speed in accordance with the programmed pressure variation in the pressure chamber. In another preferred embodiment, the programmed pressure variations are employed to modulate the set point of a pneumatic receiver controller. In this embodiment, a pneumatic tachometer is employed to provide an input to the receiver controller indicative of the spindle speed, and the pneumatic motor is connected to the output of the pneumatic receiver controller so that the spindle speed is both controlled by a closed loop control system and programmed by set point modulation. In both embodiments, program versatility is particularly enhanced by the capability of the programmer to operate with program cams which are in readily and easily interchangeable profile card form so that a precise program predetermined for a particular type of yarn may be quickly set up whenever that type of yarn is run on the particular spinning frame.

It is still a further object of the present invention to provide a programmer for the spindle speed of a spinning frame in which gradual advance of the ring rail effects gradual advance of a rod carrying operative elements of the programmer. In one preferred embodiment of the invention, a spring loaded friction clutch restrains the rod against undesired slippage. In another preferred embodiment of the invention, a pneumatically operated clutch is provided to readily permit advance of the rod and firmly impede undesired slip-back of the rod. The pneumatic clutch is releasable to permit return of the rod to its initial position for the start of a new run. The pneumatic clutch is particularly advantageous when vibration is a problem.

These and other features and objects of the present invention will be better understood by reference to the following detailed decription in conjunction with the accompanying drawings.

Figures 1, 7:
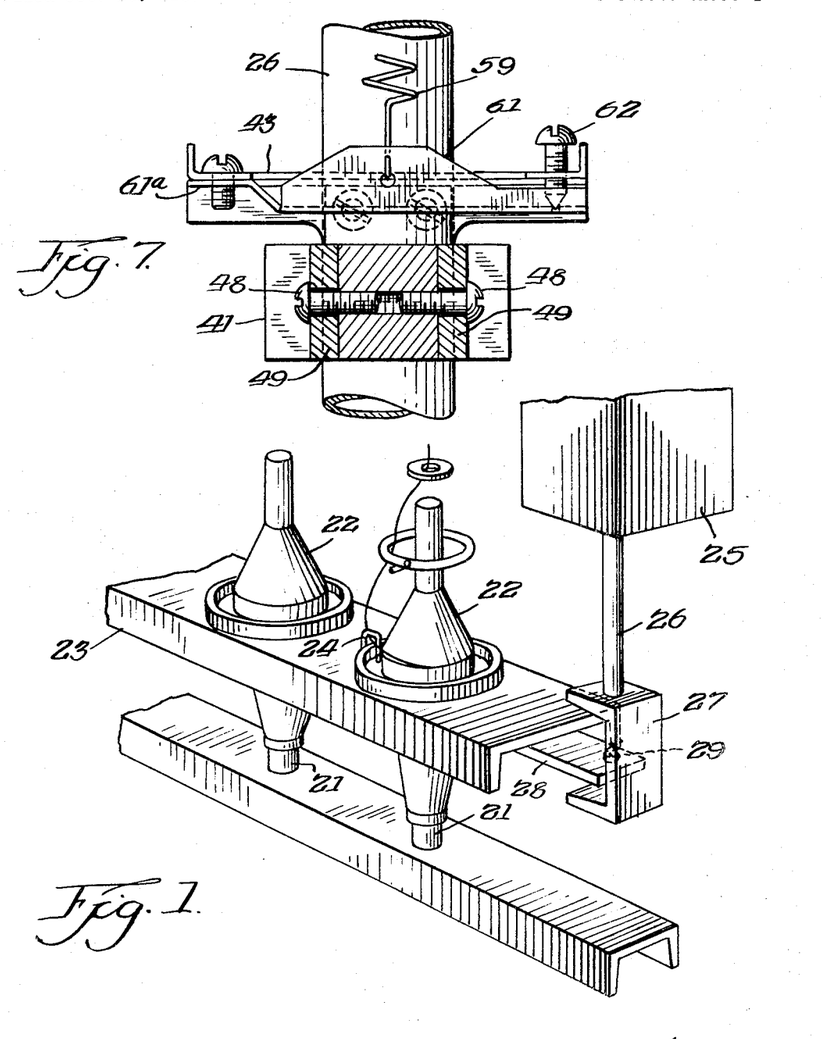
FIGURE 1 is a partly diagrammatic perspective view of a portion of a spinning frame and its connection to programming apparatus of the present invention.
FIGURE 7 is an enlarged end view of cam follower, force transmitting beam, and force balance valve assembly as taken at 7—7 of FIGURE 3.

Referring now to the drawings wherein like reference characters refer to like parts in the various views and considering, in particular, FIGURE 1, the association of the programming apparatus of the present invention with a portion of a spinning frame is illustrated. As is well-known, a conventional spining frame comprises a plurality of rotatably driven spindles 21 for receiving and rotating associated bobbins 22 and a vertically reciprocating gradually advancing ring rail 23. In conventional practice, yarn is wound onto the bobbins 22 through travelers 24 carried on the ring rail 23. As the yarn is wound onto the bobbins, the ring rail reciprocates vertically in short strokes and also gradually advances upwardly along the length of the bobbins until the bobbins have been filled and doffed from the spinning frame. The programming apparatus of the present invention will be described in conjunction with a spinning frame effecting such a filling wind although it may also be adapted for use in conjunction with other winding machines. The general objective of the programming apparatus is to provide a program in which the maximum possible spindle speed is obtained consistent with minimum rate of yarn breakage due to the changing tension condition of the yarn as the bobbin filling operation proceeds.

In the exemplary embodiments of the programming apparatus of the invention described herein, the programming apparatus senses the gradual upward advance of the ring rail 23 for the purpose of controlling the speed of the spindles 21 as a function of a predetermined program with the gradual advance of the ring rail. As seen in FIGURE 1, the programming apparatus includes a stationarily mounted housing 25 through which passes a vertical rod 26 which is adapted for vertical movement along its axis as will be further described. At the lower end of the rod 26, there is mounted a vertically-oriented bracket 27 for receiving a member 28 rigidly secured to the ring rail 23 and having an adjustable contact screw 29 for contacting the upper portion of the bracket 27 with each upward step of gradual advance of the ring rail for the purpose of stepping the rod 26 correspondingly upward so that the rod 26 will gradually advance upwardly with the gradual upward advance of the ring during the filling operation. In order to prevent the rod 26 from slipping downwardly when the contact screw 29 is not in contact with the upper portion of the bracket 27, clutch means are provided which will be described hereinafter.

The bracket 27 must be of such length that the bottom portion thereof is not contacted by the member 28 or its contact screw 29 when the ring rail moves downwardly in its reciprocating action. Thus, the member 28 and bracket 27 cooperate to form a lost motion connection between the programming apparatus and the ring rail 23, enabling the programming apparatus to sense or follow only the gradual upward advance of the ring rail during the filling operation.

Figure 2:
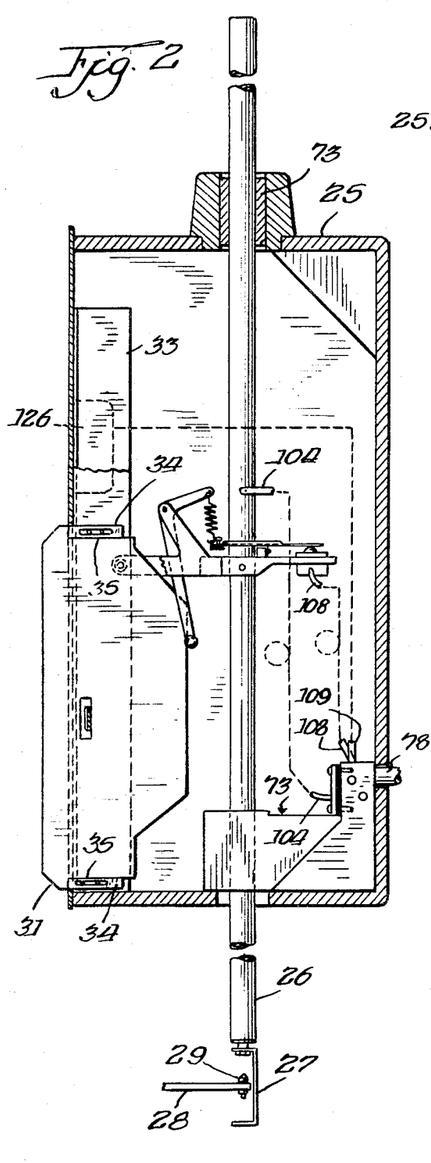
FIGURE 2 is a cross-sectional view of a preferred form of programming apparatus according to the present invention.
Figures 3, 5:
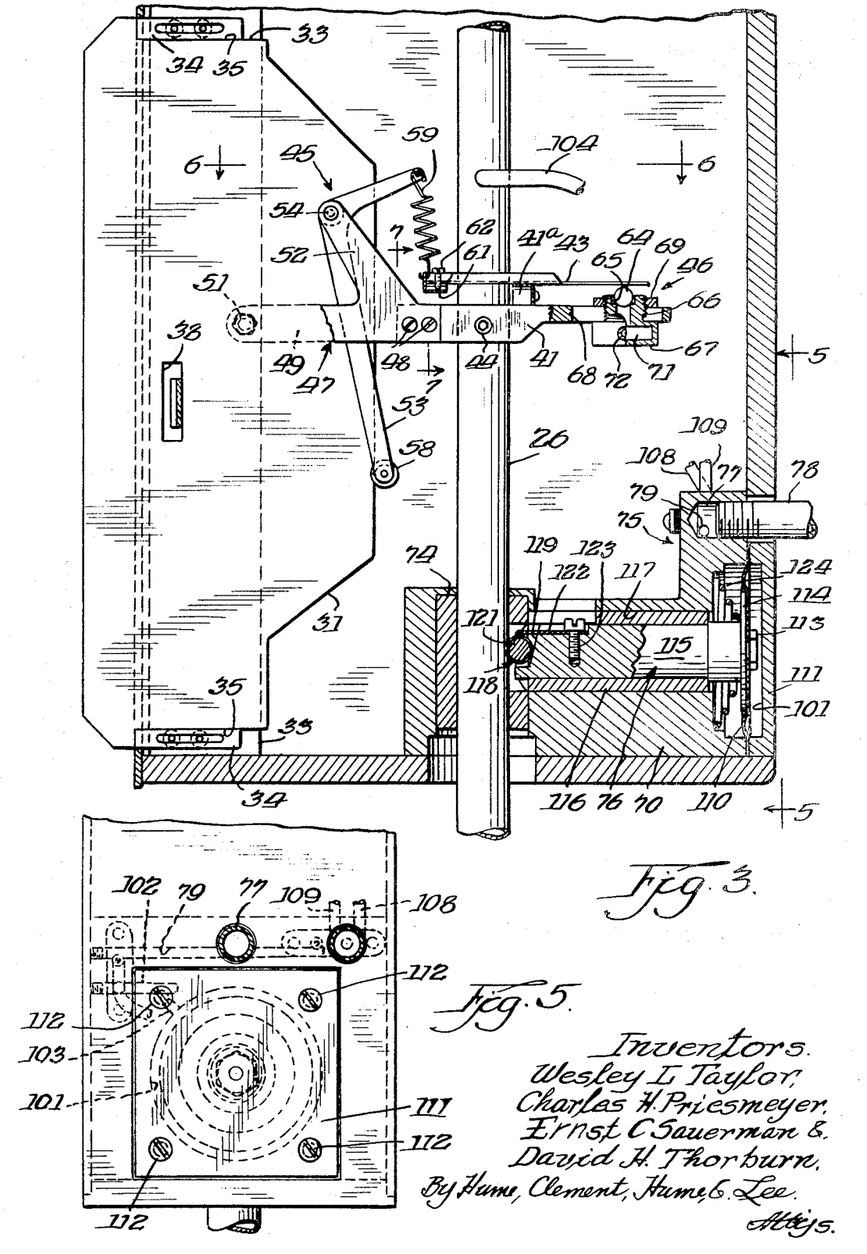
FIGURE 3 is an enlarged portion of a cross-sectional view of the programming apparatus shown in FIGURE 2.
FIGURE 5 is a rear elevational view taken at 5—5 of FIGURE 3.
Figure 4:
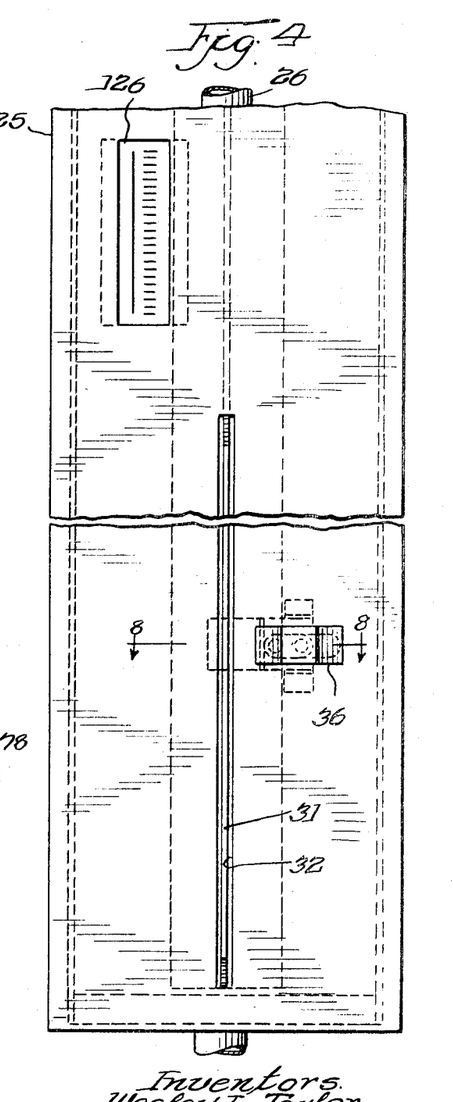
FIGURE 4 is a front elevational view of the programming apparatus of FIGURE 2.
Figures 8, 9, 10, 11, 12:
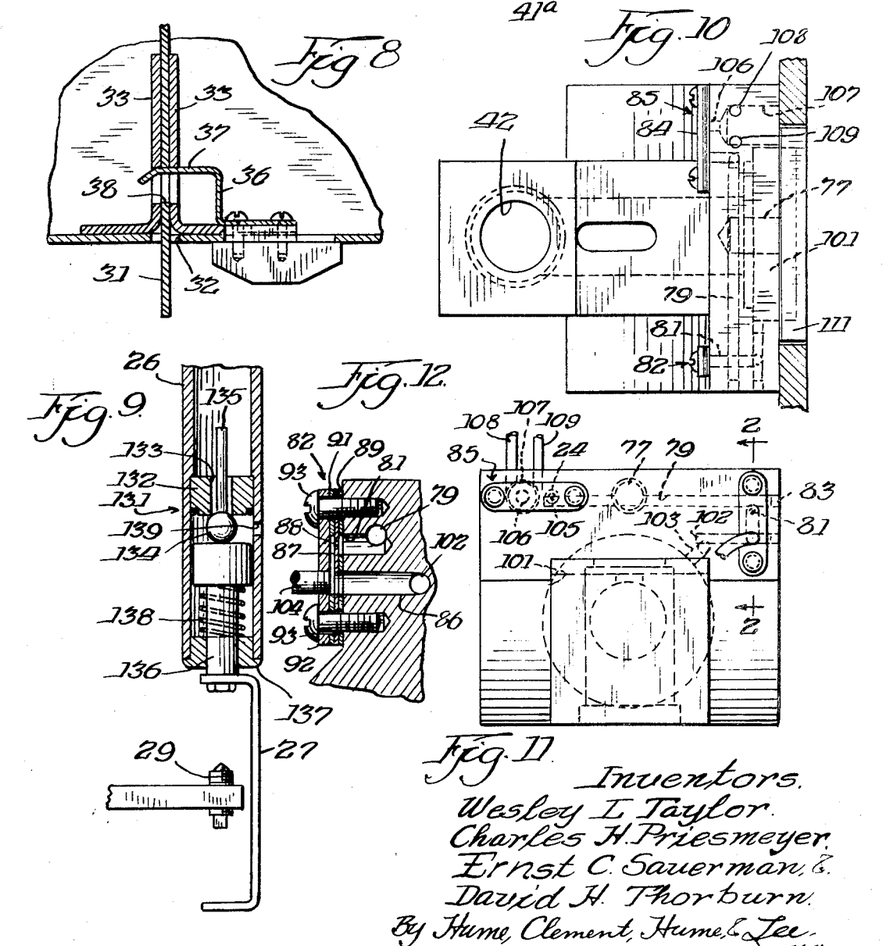
FIGURE 8 is a top plan view of the cam positioning spring clip as taken at 8—8 of FIGURE 4.
FIGURE 9 is a partially elevational, partially cross-sectional view of the lower end of the programmer rod to illustrate the clutch valve.
FIGURE 10 is a top plan view of the corner block assembly of the programming apparatus.
FIGURE 11 is a front elevational view of the corner block assembly of the programming apparatus.
FIGURE 12 is a cross-sectional view taken at 12—12 of FIGURE 11.

Referring now to FIGURES 2, 3, and 4, it is seen that the programming apparatus further includes in association with the housing 25 a spindle speed program card or cam 31 which is removably inserted within a vertical slotted opening 32 in the front of the housing 25. The profile of the program card 31 defines the speed of the spindle desired in relation to the position of gradual advance of the ring rail as will be better understood as this description proceeds. A pair of angle members 33 are vertically-oriented and secured to the housing 25 adjacent the slot 32 to provide lateral stability for the program card 31 after insertion of the card into the slot 32. A pair of adjustable stops 34 are mounted on the angle members 33 for engagement within corresponding step cutouts 35 at the top and bottom of the program card 31 for the purpose of accurately positioning the program card 31 within the housing 25. The card 31 is held securely against the stops 34 by a slidable spring clip 36 which, as best shown in FIGURE 8, has a cantilevered forward spring steel portion 37 arranged to engage in a slot 38 provided in the program card 31 to urge the program card in the direction of the rod 26. To permit removal of the program card 31, the spring clip 36 is slid to the right in FIGURE 8, withdrawing the spring portion 37 from the slot 38.

Figure 6:
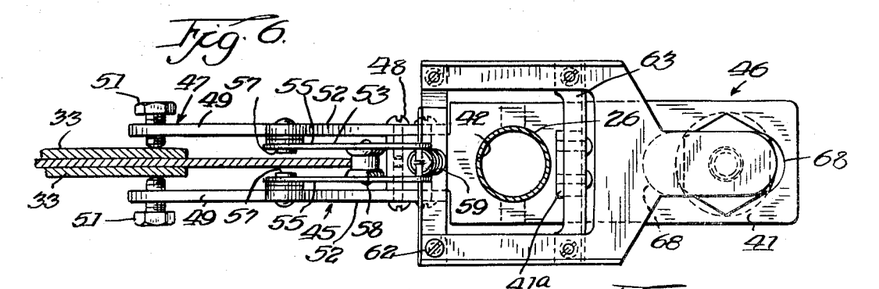
FIGURE 6 is an enlarged top plan view of the cam follower, force transmitting beam, and force balance valve assembly as taken at 6—6 of FIGURE 3.

Referring now, in particular, to FIGURES 3 and 6, it is seen that a platform 41 is mounted on an intermediate portion of the rod 26. The rod 26 is passed through a circular opening 42 in the platform 41 and the platform is fixed in place on the rod 26 by a screw 44 or other suitable fastening means. The circular opening 42 preferably forms a tight fit of the platform 41 on the rod 26 so that the platform 41 will be rigidly maintained in position perpendicular to the rod 26. On one end, the platform 41 carries a cam follower assembly 45. At its opposite end, the platform 41 carries a force balance valve assembly 46 which is operated by the cam follower assembly through a pivoted beam 43.

The cam follower assembly 45 comprises a bifurcated yoke 47 which is rigidly mounted to the platform 41 by screws or other suitable fastening means 48. The yoke 47 includes a lower pair of extending elements 49, each having a positioning screw 51 in the outermost end thereof which overlaps the angle member 33. The elements 49 function to guide the cam follower assembly as the rod 26 is gradually advanced upwardly as the filling operation proceeds. The yoke 47 further includes a second pair of elements 52 which project angularly upwardly on both sides of the program card 31 for pivotally supporting the L-shaped cam follower arm 53 at pivot axis 54. The follower arm 53 is also bifurcated construction consisting of two elements 55 disposed on opposite sides of the program card 31 and rotatably carried on suitable journals 57 at the pivot axis 54. A cam roller 58 is rotatably carried on the lower end of the follower arm 53 for following the profile of the program card 31. The upper end of the follower arm 53 is connected to the upper end of a tension spring 59 which, in turn, is connected at its lower end to a tension adjustment leaf 61 mounted on one end of the pivoted beam 43 as best illustrated in FIGURE 7. At its left end, as viewed in FIGURE 7, the tension adjustment leaf 61 is provided with an upwardly stepped portion 61a which is tightly fastened flush against the pivoted beam 43. The intermediate portion and the right end of the tension adjustment leaf 61 in FIGURE 7 are spaced from the bottom surface of the pivoted beam 43, the spacing being adjustable by means of a screw 62 threaded through the pivoted beam 43 into contact against the right end of the tension adjustment leaf 61 in FIGURE 7. By adjustment of the screw 62, the tension in the spring 59 can be selectively varied.

The pivoted beam 43 is secured to and pivoted on a torsional flexure bar 63 which, in turn, affixed to a raised mounting block 41a on the platform 41. At its right end as viewed in FIGURES 3 and 6, the pivoted beam 43 impinges against a ball valve member 64 which is movably disposed in a valve seat 65 provided at the upper end of exhaust port 66 of the force balance valve assembly 46. The upward force exerted upon the left end of the pivoted beam 43, as viewed in FIGURE 3, by the tension spring 59 is translated to a downward force exerted upon the ball valve member 64 by the pivoted beam 43. The ball valve member 64 is provided with a stem 60 extending downwardly into the exhaust port 66 to prevent the ball valve member 64 from becoming dislocated. The upper portion of the body 67 of the force balance valve assembly 46 is threaded and shaped to pass through a slot 68 provided in the right end of the platform 41 so as to enable span adjustment by loosening the valve assembly securing nut 69, slidably adjusting the position of the valve body 67 laterally in the slot 68, and re-tightening the nut 69. From the broken away portion of the force balance valve assembly 46 in FIGURE 3, it is seen that the remainder of the valve body 67 defines an interior pressure chamber 71 communicating with the exhaust port 66 and provided with an inlet port 72. As will be further described, the pressure in the chamber 71 is a function of the gradual advance of the ring rail and the contour of the program card 31 translated by the cam follower assembly 45 and beam 43 into force modulation of the force balance valve assembly 46.

At the top of the housing 25, the rod 26 passes through a suitable bearing such as a ball bushing 73 which provides lateral support for the rod 26 and readily enables the requisite vertical up-and-down movement of the rod 26. In the lower portion of the housing 25, the rod 26 is passed through a second ball bushing 74 which is mounted in a block assembly 75. The ball bushing 74 is preferably of the open type, having a longitudinal slot within which, in the present embodiment, a pneumatic clutch 76 is adapted to operate. The open type ball bushing 74 may, for example, be one of the series OPN ball bushings of Thomson Industries, Inc. of Manhasset, N.Y.

Referring now to FIGS. 3, 5, 10, and 11, it is seen that the block assembly 75 comprises a body block 70 provided with a supply port 77 for connection via conduit 78 to a suitable supply source of pneumatic fluid under pressure, for example, 20 p.s.i. The supply inlet port 77 is intersected by a bore 79 which extends at right angles with the supply inlet port 77. At one end the bore 79 intersects the inlet port 81 of a restriction assembly 82. Beyond the inlet port 81, the bore 79 is sealed by a tight-fitting plug 83. At its opposite end, the bore 79 intersects the inlet port 84 of another restriction assembly 85. The bore 79 is dead-ended at this point.

Referring briefly to FIGURE 12, it will be noted that the restriction assembly 82 comprises the inlet port 81 previously referred to, an outlet port 86, and a metallic plate 87 providing the small diameter pneumatic restriction 88. As seen in FIGURE 12, on the other side of the plate 87 are sealing gaskets 89 and 91 of neoprene or similar material which are cut as illustrated in FIGURE 12 to provide communication of fluid from the inlet port 81 through the restriction 88 to the outlet port 86. An outer retaining plate 92 and screws 93 affix the restriction assembly 82 to the block assembly 75. The outlet port 86 of the restriction assembly 82, in turn, communicates with the pneumatic clutch motor chamber 101 via conduits 102 and 103. An external conduit 104 also communicates with the outlet port 86 to provide connection with the pneumatic clutch operating valve which will be further described hereinafter.

The restriction assembly 85 has the same general metallic plate and gasket construction as shown in FIGURE 12 and, therefore, need not be described in detail. It suffices to say that the inlet port 84 of the restriction assembly 85 communicates through a restriction 105 with an outlet port 106. The restriction assembly outlet port 106 communicates directly with the program signal outlet port 107 of the programmer, with an external flexible conduit 108 to the inlet port 72 of the force balance valve assembly 46, and with an external flexible conduit 109 to a conventional pressure indicator 126 mounted in the front panel of the housing 25 and preferably calibrated to read in revolutions per minute so as to continuously indicate programmed spindle speed.

Considering now the structure of the pneumatic clutch 76, it is seen that it comprises a diaphragm 110 secured between the body block 70 and a backing plate 111 which is affixed to the body block 70 by screws 112. The backing plate 111 and the diaphragm 110 cooperate to define the pneumatic clutch motor chamber 101. The diaphragm 110 has its central portion secured by a screw 113 to a thrust plate 114 and clutch plunger 115, as best shown in FIGURE 3. The clutch plunger 115 is slidably received within a cylindrical bearing bushing 116 which, in turn, is received within a bore 117 in the body block 70. At its forward end, the clutch plunger 115 includes a roller recess 118 which is in part defined by a frontal face 119 of the plunger 115 which is inclined upwardly and rearwardly of the plunger 115 so that the roller recess 118 tends to converge downwardly. A generally hour-glass shaped roller 121 is disposed within the recess 118 between the frontal face 119 and the vertical rod 26 and retained therein by a clip 122 which is secured at its rearward end to the plunger 115 by screw 123. A compression spring 124 is disposed between a recessed portion of the body block 70 and the forward face of the thrust plate 114 for biasing the clutch plunger 115 rearwardly or to the right in FIGURE 3. The chamber within which the compression spring 124 is disposed is suitably vented to atmosphere by a vent port (not shown). Thus the plunger 115, in the absence of operating pressure within the motor chamber 101, will be withdrawn by the action of the spring 124 to readily permit either upward or downward vertical motion of the rod 26. However, with operating pressure in the motor chamber 101, the force of the spring 124 is overcome and the plunger is moved forwardly (to the left in FIGURE 3) so that the roller 121 is forced into engagement with the rod 26 on one side and the upwardly inclined frontal face 119 on the opposite side. In this condition, because of the downwardly converging configuration of the recess 118, upward movement of the vertical rod 26 will readily be permitted but downward movement is prevented as such downward movement binds the roller tightly in the recess 118 against the rod 26. Thus, so long as operating pressure is provided to the motor chamber 101, the pneumatic clutch 76 acts as a one-way clutch permitting upward movement of the rod 26 but not downward movement.

At this juncture it should be noted that the rod 26 is a hollow rod which is closed at both ends by caps. The flexible conduit 104 from the restriction assembly 82 communicates with the interior of the rod 26 so that the pressure downstream of the restriction 88 in the restriction assembly 82, and hence the pressure within the motor chamber 101 of the one-way clutch assembly 76, is the same as that within the hollow interior of the rod 26.

Turning now to FIGURE 9, it is seen that at the lower end of the rod 26 there is an exhaust valve assembly 131 which comprises a member 132 secured by tight fit or set screw (not shown) within the interior of the rod 26 having a central valve port 133. A ball valve member 134 is adapted to seat against and valve the lower end of the valve port 133. The ball valve member 134 is provided with a stem 135 extending upwardly through the valve port 133 to prevent the ball valve member 134 from becoming dislocated. The bracket 27 previously referred to is secured at its upper end to a plunger 136 which slidably extends through an opening in the bottom cap 137 of the rod 26. The upper portion of the plunger 136 is enlarged so that a compression spring 138 disposed between the bottom cap 137 and the upper portion of the plunger 136 urges the plunger upwardly against the ball valve member 134 whereby the valve port 133 is normally closed by the ball valve member 134. As previously noted, the length of the bracket 27 is such that during reciprocation of the ring rail 23 the contact screw 29 does not come into contact with the lower portion of the bracket 27. Thus, the spring 138 maintains the ball valve member 134 seated during the filling operation by upward force exerted on the plunger 136. In this manner, supply pressure is maintained in the motor chamber 101 of the pneumatic clutch 76 during the complete filling operation so that one-way clutch action is provided to permit gradual upward advance of the rod 26 with upward advance of the ring rail but prevent downward slippage of the rod 26 during downward portions of the ring rail reciprocating motion. The pneumatic clutch 76 permits the rod 26 to be driven upwardly with minimal force but provides rather large retention force to prevent downward slippage of the rod 26 due to vibration of the spinning machine. However, when the ring rail 23 is moved downwardly following completion of a filling run to reset the spinning frame, the contact screw 29 is brought into contact with the bottom flange of the bracket 27, thereby opening the valve port 133 by withdrawal of the plunger 136 and permitting the ball valve member 134 to drop. Thus, the pneumatic fluid within the tubular rod 26 is exhausted through an exhaust port 139 in the wall of the rod 26 to produce a pressure drop across the restriction 88. The pressure within the motor chamber 101 thereupon becomes insufficient to resist the force of the bias spring 124 with the result that the pneumatic clutch is retracted to permit downward movement of the rod 26.

OPERATION

Figures 15, 16:
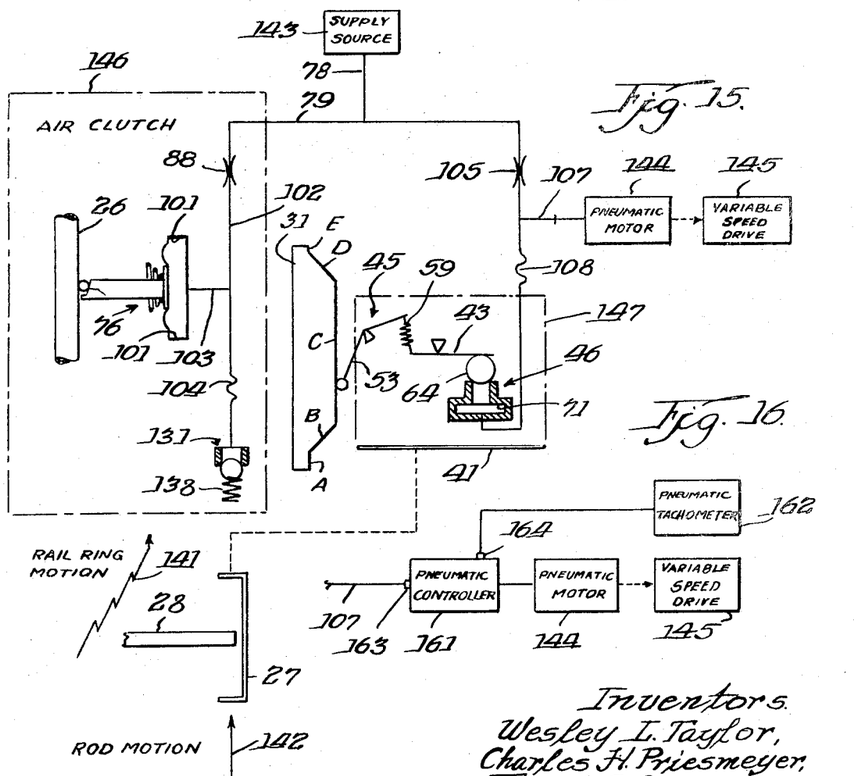
FIGURE 15 is a diagrammatic representation of a preferred form of programming apparatus according to the present invention.
FIGURE 16 is a diagrammatic representation of a modified portion of the diagrammatic representation of FIGURE 15.

Referring now to FIGURE 15, the complete programming apparatus is shown schematically. As previously noted, the motion of the ring rail 23 has a reciprocating gradually upwardly advancing motion which is diagrammatically represented by the arrow 141 in FIGURE 15. As also previously noted, the vertical rod 26 is stepped upwardly with the gradual advance of the ring rail 23 and does not follow the downward reciprocations of the ring rail. Hence, the rod motion is diagrammatically represented in FIGURE 15 by the arrow 142. The gradual upward advance of the vertical rod 26 carries the platform 41 (shown diagrammatically in FIGURE 15) gradually upward so as to move the group of elements carried by the platform 41 (shown within the diagram block 146 in FIGURE 15) upwardly along the profile of the program card 31. Throughout this upward movement, pneumatic fluid from a supply pressure source 143 is communicated through conduits 78 and 79 to restriction 88 to the conduits 102 and 103 leading to the pneumatic clutch motor chamber 101 and to the flexible conduit 104 leading to the valve 131. As previously described, the valve 131 remains closed by the force of the spring 138 during the complete filling operation so that the clutch motor chamber 101 remains at supply pressure, maintaining the pneumatic one-way clutch 76 in operative condition to permit upward movement of the rod 26 and prevent downward slippage thereof. The pressure chamber 71 of the program valve assembly 46 communicates serially through flexible conduit 108, restriction 105, conduit 79, and conduit 78 to the supply source 143. As the platform 41 is moved upwardly with the gradual advance of the vertical rod, pivotal movement of the follower arm 53 of the cam follower assembly modulates the tension in the spring 59. The modulated spring tension, in turn, is translated by the beam 43 to a modulating force on the ball member 64 of the valve assembly 46. The valve assembly 46 functions as a force balance valve assembly whereby the pressure in the chamber 71 is proportional to the magnitude of the downward force exerted upon a ball member 64 by the beam 43. More specifically, an increase in downward force on the ball valve member 64 due to an increase in tension in the spring 59 will cause the ball valve member to seat, raising the pressure in the chamber 71 until the pneumatic force on the ball member 64 is in equilibrium with the downward mechanical force exerted by the beam 43. When the valve member 64 is in equilibrium position, the leakage flow past the valve member will be that required to maintain equilibrium pressure in the chamber 71. A decrease in tension in the spring 59 will permit the ball valve member to unseat to a greater degree, dropping the pressure in the chamber 71 until it is again at equilibrium with the opposing mechanical force exerted by the beam 43. The pressure chamber 71 is in direct communication with the program signal outlet port 107 which, in turn, is connected to a suitable pneumatic motor 144 such as the 4 x 4 Powerstroke described in The Powers Regulator Company Product Data Sheet 44A-1. The Powerstroke motor is preferably provided with a positioning relay such as the Powers Sta-Put Relay which is described in The Powers Regulator Company Technical Instruction Form P-68. The combination of a pneumatic motor with a positioning relay is described in U.S. Patent No. 2,966,143. The operating shaft of the pneumatic motor 144 is suitably connected to the spindle variable speed drive 145 in the manner shown, for example, in U.S. Patent No. 3,332,224. There are various types of spindle variable speed drives which are well-known in the art. Normally the variable speed drive for the spindles also drives the ring rail motion linkage. This should be taken into account in preparing the program.

As previously noted, the interchangeable program card 31 will have its profile cut to determine the specific program desired for the spinning frame. For example, at the start of the filling run, a relatively low initial starting speed may be programmed to continue for a predetermined initial period of the filling operation by a flat profile portion such as A in FIGURE 15. Spindle speed thence may be increased at a predetermined rate by an inclined profile portion such as B to a maximum speed provided by flat profile portion such as C, and thence be reduced at a predetermined rate by a declined portion such as D. The run may be completed at a terminal speed provided by a flat profile portion such as E in FIGURE 15. Obviously, a profile of the program card 31 may vary considerably from one spinning frame to another and from one yarn type to another in any given spinning frame. In each case, the profile of the program card 31 will be translated by the cam assembly 45, spring 59, and beam 43 to a modulating force on the force balance valve assembly 46 for modulating the pressure in the chamber 71 so that the speed of the spindles will vary as a function of the contour of the program card 31 and the gradual upward advance of the ring rail. In this manner, the programming apparatus of the present invention provides ready interchangeability of programs yet faithful repetition of a given program from one run to the next.

As previously noted, a zero adjustment is provided by the adjustment screw 62 shown in FIGURES 3 and 6, and a span adjustment is provided by adjusting the position of the valve body 67 in the slot 68 of the platform 41 as shown in FIGURES 3 and 6. The range of variation of pressure in the chamber 71 is preferably approximately 3 to 15 p.s.i.

ALTERNATE FRICTION PAD CLUTCH

Figure 13:
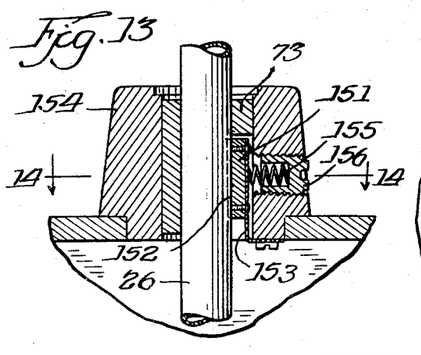
FIGURE 13 is an enlarged cross-sectional view of a modified form of clutch for use in the programming apparatus of the present invention.
Figure 14:
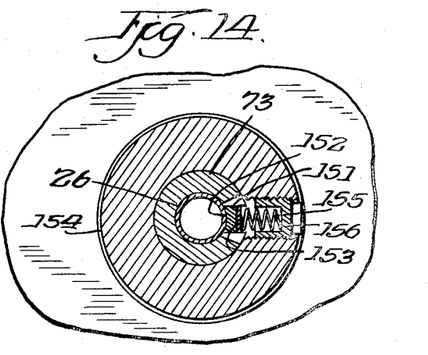
FIGURE 14 is a cross-sectional view taken at 14—14 of FIGURE 13.

In some instances the vibration of the spinning frame may not be sufficiently severe to require the employment of the one-way pneumatic clutch 76, in which case the structure shown in the diagram block 146 in FIGURE 15 may be eliminated in favor of a friction pad clutch at the upper bearing asembly as shown in FIGURES 13 and 14. In this case the ball bushing 73 will be of the open type having a gap in its circumference within which a friction pad 151 such as a nylon pad having a frontal face 152 curved compatibly with the curvature of the tubular rod 26. The pad 151 is preferably mounted on a flexible support member 153 secured to the casing 154 of the upper bearing assembly. A compression spring 155 received within an adjustment plug 156 bears against the support member 153 to continuously urge the friction pad 151 against the vertical rod 26. The force exerted by the spring 155 is adjustable by adjusting the position of the screw 156 within its threaded engagement in the casing 154. The frictional force exerted by this arrangement on the rod 26 should be sufficient to retain the rod 26 in its last upwardly stepped position against the weight of the rod plus the weight of the structure carried on the rod and whatever inertial forces may be present. Since the weight of the rod 26 and the structure carried on it is approximately ½ pound, the spring 155 may be adjusted, for example, to present an axial static friction force of 1½ pounds. At this juncture it should be noted that the force to drive the rod 26 upwardly must be kept as low as possible to prevent a jerking rod motion. In all ring rails there is some spring effect and if the rod drive forces are too high, a jerking drive will be produced attended by a stepped increase in output control pressure. This type of stepped output is undesirable since abrupt speed changes are likely to break the yarn.

It may be noted that, if necessary, both the friction pad type clutch illustrated in FIGURES 13 and 14 and the one-way pneumatic clutch previously described may be used in a single installation.

CONTROLLER SET POINT PROGRAMMING

In some instances, the accuracy of the spindle speed program may require closed loop control as well as open loop programming to prevent such factors as belt wear and slippage from introducing error in the actual speed of the spindles as compared with the speed program submitted to the variable speed drive. In such instances, the programming apparatus may additionally include a proportional pneumatic receiver controller 161 combined with a pneumatic tachometer 162 as shown in the modification of the FIGURE 15 schematic presented in FIGURE 16. The receiver controller 162 is of the type having provision for pneumatic set point adjustment. Several pneumatic controllers of this type are disclosed in "Process Instruments and Controls Handbook" by Douglas M. Considine, published in 1957 by McGraw-Hill Book Company, Inc. at pages 9–5 through 9–34. The pneumatic tachometer 162 may, for example, be of the type represented by The Forboro Company pneumatic speed transmitter type 16A. In this arrangement, the program signal conduit 107 is connected to the set point input 163 of the controller 161 and the pneumatic tachometer 162 providing a pressure signal indicative of the actual speed of the spindles has its output connected to the process variable input 164 of the controller 161. The output of the controller 161 is connected to the pneumatic motor 144 input which again is mechanically coupled to the variable speed drive 145 as previously described. With this arrangement, the set point of the controller 161 would be programmed whereby the controller would adjust the pneumatic motor 144 to provide control of the variable speed drive 145 to correct any error in the actual speed of the spindles measured by the tachometer 162 as compared with the program speed determined by the set point input to the controller 161.

While several preferred embodiments of the present invention have been described and illustrated herein, it should be understood that this is by way of example and not by way of limitation. It is contemplated that modifications may be made within the scope of the claims without departing from the spirit of the invention.

It will be noted that several of the claims refer to winding machines of the type including a ring rail, bobbin carrying spindles, and "a variable speed drive for said spindles." It is to be understood that the variable speed drive referred to in such claims may drive the ring rail movement linkage in addition to the spindles.

What is claimed is:

1. Programming apparatus comprising:
a source of pneumatic fluid under pressure;
a program cam;
pneumatic force balance exhaust valve means including a pressure chamber connected to said source through a restriction, an exhaust port for said pressure chamber, and a valve member for valving said exhaust port;
cam follower means for sensing and translating the contour of said program cam into a modulating closure force applied to said valve member, said force balance valve means developing a pressure in said pressure chamber exerting a pneumatic force on said valve member in opposing equilibrium with said closure force whereby the pressure in said pressure chamber is a function of the contour of said program cam and relative motion between said program cam and said cam follower means; and
means for effecting relative motion between said program cam and said cam follower means.

2. Pneumatic programming apparatus comprising:
a source of pneumatic fluid under pressure;
a program cam;
a valve including a pressure chamber connected to said source through a restriction and an exhaust port for said pressure chamber;
a valve member for valving said exhaust port;
a cam follower adapted to follow the contour of said program cam;
means for effecting relative motion between said program cam and said cam follower; and
means operatively interposed between said cam follower and said valve member for applying a bias force urging said cam follower into engagement with said program cam and for applying closure force on said valve member which varies in magnitude in proportion to movement of said cam follower means in opposition to said bias force by said program cam, said valve developing a force balance pressure in said pressure chamber exerting a pneumatic force on said valve member in opposing equilibrium with said closure force whereby the pressure in said pressure chamber varies in magnitude in proportion to movement of said cam follower means.

3. Pneumatic programming apparatus comprising:
a source of pneumatic fluid under pressure;
a program cam;
a valve including a pressure chamber connected to said source through a restriction and an exhaust port for said pressure chamber;
a valve member for valving said exhaust port;
a cam follower adapted to follow the contour of said program cam;
means for effecting relative motion between said program cam and said cam follower;
a member for transmitting closure force to said valve member; and
spring means operatively interposed between said cam follower and said force transmission member for applying a bias force urging said cam follower into engagement with said program cam and an equal and opposite closure force on said force transmission member such that a closure force is applied to said valve member having a magnitude which is a function of the movement of said cam follower by said program cam in opposition to said bias force, said valve developing a force balance pressure in said pressure chamber exerting a pneumatic force on said valve member in opposing equilibrium with said closure force whereby the pressure in said pressure chamber is a function of the contour of said program cam and relative motion between said program cam and said cam follower.

4. The programming apparatus defined in claim 3 wherein said cam follower is pivotally mounted intermediate its ends and said force transmission member is pivotally mounted intermediate its ends and said spring means comprises a tension spring interconnected between one end of said cam follower and one end of said force transmission member such that the other end of said cam follower is urged against said program cam surface and such that the other end of said force transmission member is urged against said valve member.

5. In a control system for a winding machine of the type having a reciprocating gradually advancing ring rail, bobbin carrying spindles, and a variable speed drive for said spindles, the combination therewith comprising:
  a source of pneumatic fluid under pressure;
  a spindle speed program cam;
  pneumatic force balance exhaust valve means including a pressure chamber connected to said source through a restriction;
  cam follower means for sensing and translating the contour of said spindle speed program cam into a modulating force applied to said force balance valve means such that the pressure in said pressure chamber is a function of the contour of said spindle speed program cam when said cam follower means is advanced along said spindle speed program cam;
  means for gradually advancing the position of said cam follower means relative to said spindle speed program cam contour with the gradual advance of said ring rail; and
  means connected to said pressure chamber for adjusting said variable speed drive in accordance with the pressure in said pressure chamber whereby the speed of said spindles varies as a function of the contour of said spindle speed program cam and the gradual advance of said ring rail.

6. In a control system for a winding machine of the type having a reciprocating gradually advancing ring rail, bobbin carrying spindles, and a variable speed drive for said spindles, the combination comprising:
  a source of supply pressure;
  a spindle speed program cam;
  a valve including a pressure chamber connected to said source of supply pressure through a restriction and an exhaust port for said pressure chamber;
  a valve member for valving said exhaust port;
  a cam follower adapted to follow the contour of said program cam;
  means for gradually advancing the position of said cam follower relative to the contour of said program cam with the gradual advance of said ring rail;
  a member for transmitting closure force to said valve member;
  spring means operatively interposed between said cam follower and said force transmission member for applying a bias force urging said cam follower into engagement with said program cam and an equal and opposite closure force on said force transmission member such that a closure force is applied to said valve member having a magnitude which is a function of the displacement of said cam follower by said program cam in opposition to said bias force whereby the pressure in said pressure chamber is a function of the contour of said program cam; and
  means connected to said program signal outlet port for adjusting said variable speed drive in accordance with the pressure in said pressure chamber whereby the speed of said spindles varies with the gradual advance of said ring rail as a function of the contour of said spindle speed program cam.

7. The combination defined in claim 6 wherein said means for adjusting said variable speed drive comprises a pneumatic motor.

8. The combination defined in claim 6 wherein said means for adjusting said variable speed drive comprises:
  a pneumatic receiver controller having process variable input and having a pneumatic set point adjustment input connected to said pressure chamber;
  means for deriving and submitting to the process variable input of said receiver controller a pressure signal indicative of the speed of said spindles; and
  a pneumatic motor connected to the output of said receiver controller.

9. The combination defined in claim 6 wherein said means for gradually advancing the position of said cam follower relative to the contour of said program cam comprises:
  a rod slidably mounted for travel in a vertical path;
  spring loaded friction clutch means for restraining downward movement of said rod;
  means mounting said cam follower means, said valve, and said force transmitting memebr on said rod for common travel with said rod; and
  means for abutting and moving said rod upwardly with each gradual advance stroke of said ring rail.

10. The combination defined in claim 6 wherein said means for gradually advancing the position of said cam follower relative to the contour of said program cam comprises:
  a rod slidably mounted for travel in a vertical path;
  a clutch plunger mounted at right angles to said rod and having a frontal surface oriented upwardly and away from said rod to form a clutch roller recess;
  a clutch roller interposed in said recess between said rod and said clutch plunger frontal surface;
  a pneumatic diaphragm motor for urging said clutch plunger toward said rod when said diaphragm motor is pressurized such that upward travel of said rod is permitted but downward motion is impeded;
  valve means communicating with said source of supply pressure for normally maintaining said diaphragm motor at supply pressure; and
  lost motion connection means for moving said rod upwardly with each gradual advance stroke of said ring rail.

11. The combination defined in claim 10 wherein said valve means comprises:
  a conduit connecting said diaphragm motor to said source through a restriction; and
  a normally-closed exhaust valve for said diaphragm motor.

12. In a control system for a winding machine of the type having a ring rail, bobbin carrying spindles, and a variable speed drive for said spindles, the combination therewith comprising:
  a slidably mounted rod;
  means interposed between said ring rail and said rod for effecting sliding movement of said rod as a predetermined function of movement of said ring rail;
  a supply source of fluid;
  valve means communicating with said supply source and mounted on said rod for travel therewith;
  a program cam;
  cam follower means mounted on said rod for travel therewith for modulating said valve means as a function of the contour of said program cam and the position of said ring rail; and
  means communicating with said valve means for receiving fluid signals from said valve means for adjusting said variable speed drive in accordance with modulation of said valve means by said cam follower means.

13. In a control system for a winding machine of the type having a reciprocating gradually advancing ring rail, bobbin carrying spindles, and a variable speed drive for said spindles, the combination therewith comprising:
- a rod slidably mounted for travel in a vertical path;
- a lost motion connection between said rod and said ring rail for gradually advancing said rod with gradual advance of said ring rail;
- a program cam;
- a supply source of fluid;
- valve means communicating with said supply source and mounted on said rod for travel therewith;
- cam follower means mounted on said rod for travel therewith for modulating said valve means as a function of the contour of said program cam and the gradual advance of said ring rail; and
- means communicating with said valve means for receiving fluid signals from said valve means for adjusting said variable speed drive in accordance with modulation of said valve means by said cam follower means.

14. The combination defined in claim 13 further comprising:
- spring loaded friction clutch means for restraining downward movement of said rod.

15. The combination defined in claim 13 further comprising:
- a fluid operated clutch for restraining downward movement of said rod when in engagement; and
- valve means communicating with said supply source of fluid for normally maintaining said clutch in engagement.

16. The combination defined in claim 13 further comprising:
- a clutch plunger mounted at right angles to said rod and having a frontal recess oriented upwardly and away from said rod to form a clutch roller recess;
- a clutch roller interposed in said recess between said rod and said clutch plunger frontal surface;
- a fluid operated motor for urging said clutch plunger toward said rod when actuated so that upward travel of said rod is permitted but downward movement is impeded; and
- valve means communicating with said supply source of fluid for normally maintaining said fluid operated motor actuated.

17. In a control system for a winding machine of the type having a ring rail, bobbin carrying spindles, and a variable speed drive for said spindles, the combination therewith comprising:
- a source of pneumatic fluid under pressure;
- valve means communicating with said source of pneumatic fluid under pressure;
- a spindle speed program cam;
- cam follower means for sensing the contour of said spindle speed program cam and modulating said valve means in accordance therewith;
- means for effecting change of sensing position of said cam follower means on said spindle speed program cam contour in accordance with change in position of said ring rail;
- a pneumatic receiver controller having a process variable input and having a pneumatic set point adjustment input communicating with said valve means for receiving pressure signals from said valve means indicative of the modulation of said valve means by said cam follower means;
- means for deriving and submitting to said process variable input of said receiver controller a pressure signal indicative of the speed of said spindles; and
- a pneumatic motor connected to the output of said receiver controller for adjusting said variable speed drive whereby the speed of said spindles is controlled as a function of the contour of said spindle speed program cam and the position of said ring rail.

18. In a control system for a winding machine of the type having a ring rail, bobbin carrying spindles, and a variable speed drive for said spindles, the combination comprising:
- a source of pneumatic fluid under pressure;
- a pneumatic motor for adjusting said variable speed drive;
- a pneumatic receiver controller having a process variable input, a pneumatic set point input, and an output connected to said pneumatic motor;
- valve means interconnected between said source of pneumatic fluid under pressure and said pneumatic set point input of said pneumatic receiver controller;
- sensing means connected to said valve means for sensing the position of said ring rail and modulating said valve means in accordance with a predetermined program; and
- means for deriving and submitting to said process variable input of said receiver controller a pressure signal indicative of the speed of said spindles whereby the speed of said spindles is controlled as a function of said predetermined program and the position of said ring rail.

19. In a control system for a winding machine of the type having a reciprocating gradually advancing ring rail, bobbin carrying spindles, and a variable speed drive, the combination therewith comprising:
- a source of pneumatic fluid under pressure;
- valve means communicating with said source of fluid under pressure;
- a spindle speed program cam;
- cam follower means for sensing the contour of said spindle speed program cam and modulating said valve means in accordance therewith;
- means including a lost motion connection for effecting change in sensing position of said cam follower means relative to said spindle speed program cam contour only in accordance with the gradual advance of said ring rail and not in accordance with the reciprocating motion of said ring rail; and
- means communicating with said valve means for receiving fluid signals from said valve means for adjusting said variable speed drive in accordance with modulation of said valve means by said cam follower means.

20. In a control system for a winding machine of the type having a reciprocating gradually advancing ring rail, bobbin carrying spindles, and a variable speed drive, the combination therewith comprising:
- a supply source of fluid;
- valve means communicating with said supply source of fluid;
- a spindle speed program cam;
- cam follower means for sensing the contour of said spindle speed program cam and modulating said valve means in accordance therewith;
- means carrying said valve means and said cam follower means for moving said cam follower means and said valve means relative to said program cam as a predetermined function of the movement of said ring rail; and
- means communicating with said valve means for receiving fluid signals from said valve means for adjusting said variable speed drive in accordance with modulation of said valve means by said cam follower means.

21. The combination defined in claim 20 further comprising means including a spring element for removably retaining and positioning said spindle speed program cam.

References Cited

UNITED STATES PATENTS

| | | | |
|---|---|---|---|
| 2,803,107 | 8/1957 | Long | 57—95 |
| 2,959,029 | 11/1960 | Best | 137—82 XR |
| 3,040,529 | 6/1962 | Hurtle | 127—82 XR |

(References on following page)

PO-1050
(5/69)

UNITED STATES PATENT OFFICE
CERTIFICATE OF CORRECTION

Patent No. 3,472,014　　　　　　　　Dated October 14, 1969

Inventor(s)　Wesley L. Taylor, Charles H. Priesmeyer, Ernst C. Sauerman, and David H. Thorburn It is certified that error appears in the above-identified patent and that said Letters Patent are hereby corrected as shown below:

In the specification: Column 1, line 62, "to" should read --of--. Column 3, line 34, "spining" should read --spinning--; Column 3, line 70, after "ring" insert --rail--. Column 5, line 5, after "turn," insert --is--; Column 5, line 52, "intersecets" should read --intersects--. Column 7, line 58, after "88" insert --and through restriction 88--.

In the claims: Column 12, line 22 (claim 9), "memebr" should read --member--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents